Patented Feb. 1, 1927.

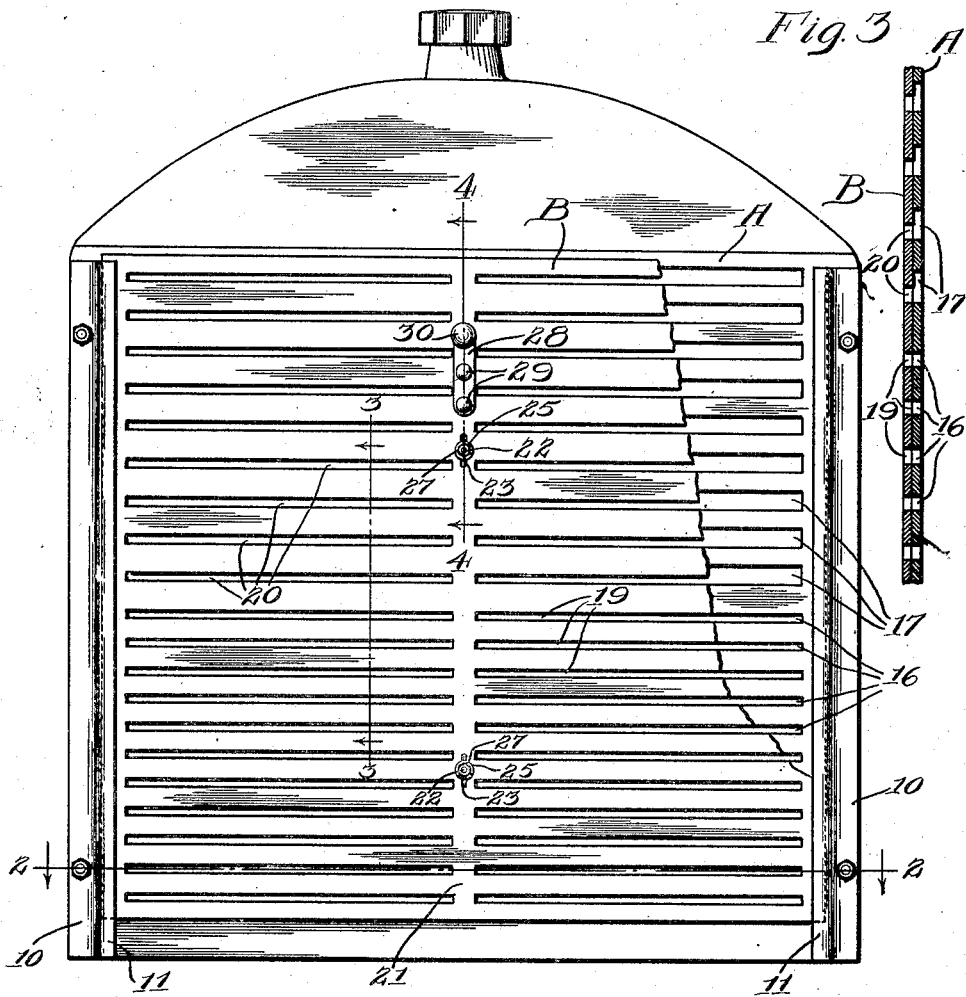

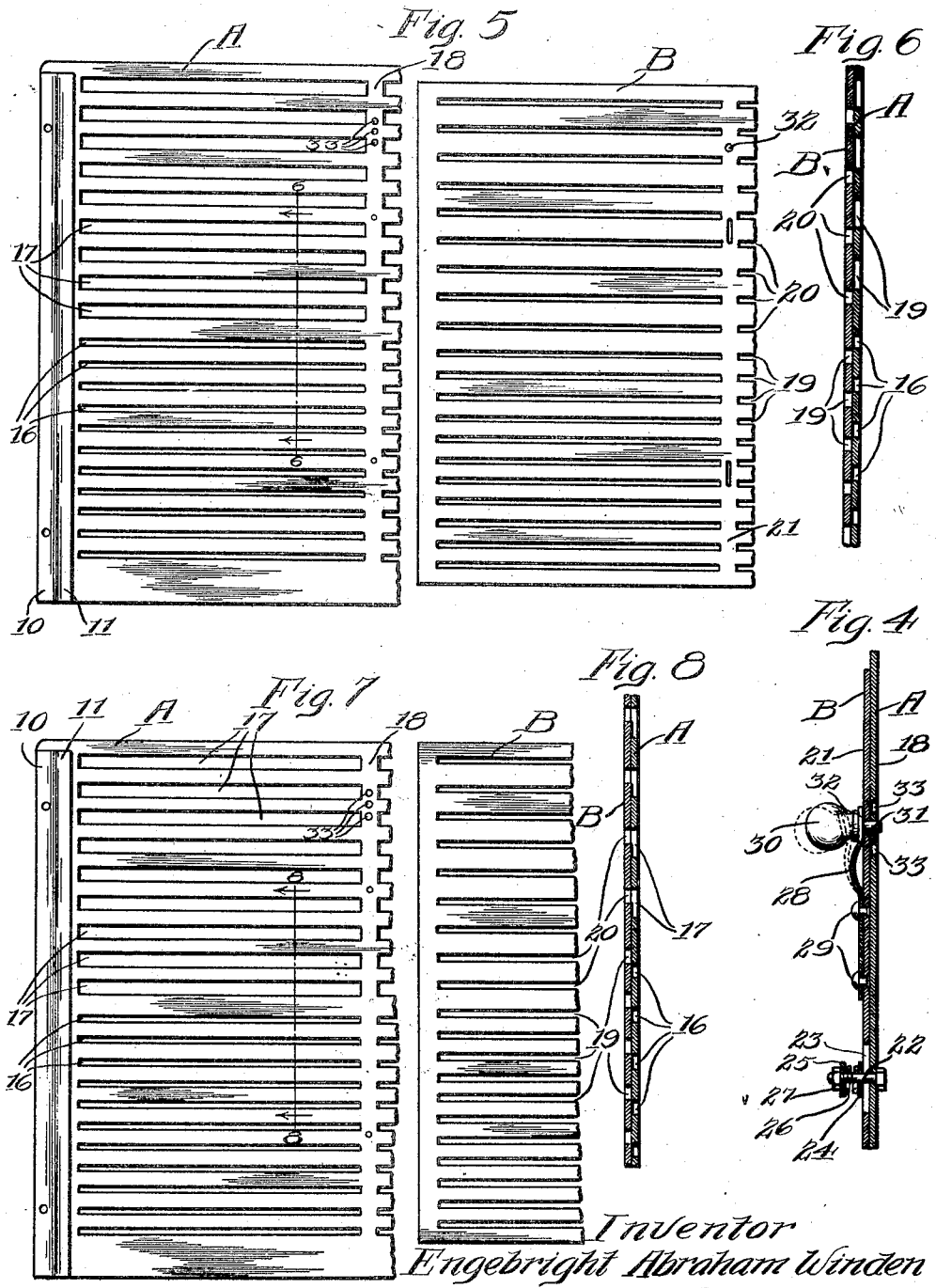

1,616,245

UNITED STATES PATENT OFFICE.

ENGEBRIGHT ABRAHAM WINDEN, OF WILLMAR, MINNESOTA.

RADIATOR SHUTTER.

Application filed January 16, 1925. Serial No. 2,932.

My invention relates to improvements in radiator shutters for automobiles.

An object of the invention is to provide a simple, durable and inexpensive shutter designed to be conveniently applied to the front of an automobile radiator and adapted to be adjusted readily, in varying degrees, through a range embodying three stages, one stage in the adjustable range of said shutter providing for the passage of air therethrough from top to bottom thereof, a second stage providing for the passage of air through the shutter only at the upper portion thereof and a third stage providing for entirely precluding the passage of air through said shutter.

With the foregoing and other objects in view, which will appear in the following description, the invention resides in the novel combination and arrangement of parts and in the details of construction hereinafter described and claimed.

In the drawings, Fig. 1 is a front elevation of a shutter embodying my invention, the same being illustrated as applied to the radiator of an automobile, a portion of the front plate of the shutter being broken away to show a portion of the back plate, said front plate being shown in one stage of its adjustable range of movement over the back plate; Fig. 2 is a sectional view taken on the line 2—2 of Fig. 1; Fig. 3 is a similar view taken on the line 3—3 of said Fig. 1; Fig. 4 is also a sectional view, the same being taken as on the line 4—4 of said Fig. 1; Fig. 5 is a fragmentary view in diagram of the two shutter plates arranged side by side to show the relative arrangement and dimensions of the slots and plate stock between said slots in the front and back plates, said view of said plates showing the relative longitudinal relation thereof in a second stage in the adjustment of the front plate on said back plate; Fig. 6 is a sectional view taken as on the line 6—6 of Fig. 5 in the stage of adjustment of the front plate as shown in said Fig. 5; Fig. 7 is a view similar to Fig. 5 and shows a third stage in the adjustment of the front plate on the back plate and Fig. 8 is a view similar to Fig. 6, the same being taken as on the line 8—8 of Fig. 7 in the stage of adjustment of the front plate as shown in said Fig. 7.

Referring to the drawings, it will be seen that my improvement includes a back plate A and a front plate B, the former having marginal portions at its sides turned upon itself to form reinforcing side ribs 10 and opposed guide lips 11. Said back plate A is secured in covering relation over the front of a radiator core, as at 12, by means of bolts 13 reaching through the front beads 14 of the radiator shell 15 and through the ribs 10 of said plate A. The plates A, B, are assembled face to face, the latter being slidably guided on the former by the lips 11, which overreach the front plate B at the sides thereof. In the back plate A are a plurality of slots 16, 17 traversing said plate at either side of a central zone 18, the slots 16 constituting a lower group and the slots 17 constituting an upper group. In the front plate B are a plurality of slots 19, 20 traversing said plate at either side of a central zone 21, the slots 19 constituting a lower group complementing the lower group of slots 16 in the back plate A and the slots 20 constituting an upper group complementing the upper group of slots 17 in said back plate A. The slots 19, 20 in the front plate B and the slots 16 in the back plate A are equal in width and one-half as wide as the slots 17 in said back plate. The distance between adjacent slots 19 in the front plate B and adjacent slots 16 in the back plate A is twice the width of one of said slots. The distance between adjacent slots 20 in the front plate B and between the lowermost slot 20 and the uppermost slot 19 in said plate is three times the width of one of said slots. The distance between adjacent slots 17 in the back plate A equals the width of one of said slots. The distance between the lowermost slot 17 in the back plate A and the uppermost slot 16 in said plate is three times the width of one of the slots 16. From the foregoing, it will be understood that the slots 19, 20 in the front plate B register fully with the slots 16, 17 in the back plate A in that relation of said plates shown in Figs. 1 and 3; that none of the slots 19, 20 of the front plate B register with slots 16, 17 of the back plate A in that relation of said plates shown in Figs. 5 and 6; that the slots 20 in the front plate B register fully with the slots 17 in the back plate A in that relation of said plates shown in Figs. 7 and 8 and that in said last relation of the plates A, B the slots 19, 16 therein do not register. By shifting the front plate B on the back plate A and thereby passing from the stage of adjustment wherein the shutter is full closed (Fig. 6) to that stage wherein the shutter is full open (Fig. 3) or vice versa, the desired graduations of adjustment may be had. Moving said plate B over the plate A in passing from said last stage of adjustment to the third stage, wherein only the lower portion of the shutter is full closed (Fig. 8), or vice versa, the desired graduations of adjustment in the openings through said lower portion may be had, the openings through the upper portion of the shutter remaining unrestricted.

The front plate B is yieldingly secured in various positions of adjustment on the back plate A in a very simple and effective manner. Bolts 22 reaching through the zone 18 of the back plate A pass through vertical slots 23 in the zone 21 of the front plate B. Each bolt 22 carries two washers 24, 25 and a spring 26 interposed between the same. Each spring 26 backs its respective washer 24 against the front plate B and its respective washer 25 against a nut 27 on the bolt 22 encircled by said spring. Acting through the bolts 22 and washers 24, said springs 26 yieldingly, frictionally engage the two plates A, B, thus yieldingly holding the plate B in adjusted positions on the plate A.

I also supply a positive locking device for releasably securing the front plate B in the three positions wherein the said three distinct stages in the range of adjustment of the shutter are attained. This positive locking device is best shown in Fig. 4, wherefrom it will be seen that a spring leaf 28 is secured at its lower end, by rivets 29, to the front plate B in the unslotted zone 21 thereof. The upper end of said spring leaf 28 yieldingly bears against the face of said front plate B, said end of said leaf being provided at its outer face with a pull knob 30 and at its inner face with a latch pin 31. Said pin 31 extends through an opening 32 in the front plate B and into either of three latch openings 33 in the back plate A. Pulling upon the knob 30 bends the spring leaf 28 outward and withdraws the latch pin 31 from the latch opening 33 into which it projects. Thus freeing the front plate B, the user may shift said plate into the newly desired position, whereupon the knob 30 is released and the latch pin 31 carried into a different latch opening 33. Since there is one latch opening 33 for each of the main stages of adjustment of the shutter, it will be understood that said openings are accordingly arranged to suit said stages of adjustment.

In use, the front plate B is set to attain the full open stage of adjustment (Figs. 1 and 3), when it is desired that the maximum volume of air may pass through the shutter, such adjustment being suitable in warm weather, or in cool weather, after the automobile engine has become heated to point of efficiency. In driving in extremely cold weather, or in starting his engine in such weather, or mildly cold weather, the user sets the plate B to attain the full closed stage of adjustment (Fig. 6). For driving in cold weather, the plate B is fixed to attain that stage of adjustment (Fig. 8), wherein the upper portion of the shutter is full open and the lower portion full closed. This latter adjustment is a very important one since the lower, colder portion of the radiator is protected against freezing air currents, while only the upper warmer portion of the radiator is subjected to the cold air. When desired, the finer adjustments between the three main stages may be obtained, as hereinbefore indicated.

Changes in the specific form of my invention, as herein disclosed, may be made within the scope of what is claimed without departing from the spirit of my invention.

Having described my invention, what I claim as new and desire to protect by Letters Patent is:

1. In a device of the class described, front and back shutter plates, means for slidably guiding the front plate longitudinally of said back plate, said plates being formed with complementary upper groups and complementary lower groups of slots formed transversely thereof, the slots of both groups in the front plate and the slots of the lower group in the back plate being equal in width and one-half as wide as the slots of the upper group in said back plate, the distance between slots of the lower groups being twice the width of said slots, the distance between slots of the upper group in the front plate being thrice the width of said slots, the distance between slots of the upper group of the back plate being the same as the width of said slots, the distance between adjacent slots of the two groups in each plate being thrice the width of the uniformally formed slots of both groups in the front plate and of the lower group in the back plate.

2. In a device of the class described, elongated front and back shutter plates, guides at the sides of the back plate, said front plate being slidable marginally in said guides in a plane closely paralleling the plane of said back plate, each plate having upper and lower co-operatively related groups of slots formed transversely thereof, the upper groups of slots and the lower groups of slots, respectively, complementing each other, the slots of both groups in the front plate and the slots of the lower group in the back plate being equal in width and one-half as wide as the slots of the upper group in said back plate, the distance between slots of both lower groups being twice the width of said slots, the distance between slots of the upper group in the front plate being thrice the width of said slots and the distance between slots of the upper group in the back plate being the same as the width of said slots.

3. In a device of the class described, a pair of plates arranged face to face and movable one upon the other, each plate having co-operatively disposed upper and lower groups of apertures formed therein, each group of apertures in one plate complementing the corresponding group of apertures in the other plate, the apertures of both groups in one plate and of the lower group in the second plate being equal in width and one-half as wide as the apertures of the upper group in said second plate, the distance between apertures in both lower groups being twice that of the width of said apertures, the distance between apertures of the upper group of said first plate being thrice that of said apertures and the distance between apertures of the upper group of said second plate being the same as the width of the apertures therein, the expressed relative dimensions of said apertures and of the spacing thereof being measured on the same line of movement between said plates.

4. In a shutter, a plate adapted to be disposed over the front of an automobile radiator, a second plate, means for movably mounting said second plate face to face with respect to said first plate, said plates being formed with apertures therein proportioned and arranged to permit of the passage of air through the shutter at elevations from top to bottom thereof in one relation of said plates, also to permit of the passage of air only through the upper portion of said shutter, in a second relation of said plates, and, further, to entirely obstruct the passage of air through the shutter in a third relation of said plates, and a locking device carried by said second plate and co-acting with said first plate for releasably securing said second plate with respect to said first plate in said relations aforesaid.

5. In a shutter, a plate adapted to be disposed over the front of an automobile radiator, a second plate, means for movably mounting said second plate face to face with respect to said first plate, said plates being formed with apertures therein proportioned and arranged to permit of the passage of air through the shutter at elevations from top to bottom thereof in one relation of said plates, also to permit of the passage of air only through the upper portion of said shutter in a second relation of said plates and, further, to entirely obstruct the passage of air through the shutter in a third relation of said plates, and a tie between said plates frictionally engaging the same and yieldingly holding said second plate in adjusted positions on said first plate.

6. In a shutter, a plate adapted to be disposed over the front of an automobile radiator, a second plate, means for movably mounting said second plate face to face with respect to said first plate, said plates being formed with apertures therein proportioned and arranged to permit of the passage of air through the shutter at elevations from top to bottom thereof, in one relation of said plates also to permit of the passage of air only through the upper portion of said shutter in a second relation of said plates, and, further, to entirely obstruct the passage of air through the shutter in a third relation of said plates and means for yieldingly holding said second plate with respect to the first plate in various relations including those aforesaid.

7. In a shutter, a plate adapted to be disposed over the front of an automobile radiator, a second plate, means for movably mounting said second plate face to face with respect to said first plate, said plates being formed with apertures therein proportioned and arranged to permit of the passage of air through the shutter at elevations from top to bottom thereof in one relation of said plates, also to permit of the passage of air only through the upper portion of said shutter in a second relation of said plates and, further, to entirely obstruct the passage of air through the shutter in a third relation of said plates.

8. In a device of the class described, two shutter members disposed face to face and slidable one on the other, said members being formed with slots therein, traversing the lines of movement between said members and being proportioned and arranged to permit, in one relation of said members, full registration of the slots in one member with the slots in the other member and, in another relation of said members, to permit of full registration only of those slots in the upper portion of one member with the corresponding slots in the other member and, in a third relation of said members, to preclude registration of any of the slots in said members.

9. In a device of the class described, two shutter members disposed face to face and slidable one on the other, said members being formed with slots therein traversing the lines of movement between said members and proportioned and arranged to permit, in one relation of said members, full registration of the slots in one member with the slots in the other member and, in another relation of said members, to permit of full registration only of those slots in the upper portion of one member with the corresponding slots in the other member.

10. In a device of the class described, a fixed plate having two groups of openings therein, the openings of one group being larger than those of the other group, a single shutter movable along said plate, said shutter having two groups of openings therein all of said openings being of the same size, the openings of one of said groups being adapted to register with the openings of one of the groups in said plate, the openings of the other of said groups of said shutter being adapted to register with a portion only of the openings of the other of said groups of said plate and means for guiding the movement of said shutter relative to said plate.

In testimony whereof, I have signed my name to this specification.

ENGEBRIGHT ABRAHAM WINDEN.